(12) United States Patent
Uki (10) Patent No.: US 12,142,871 B2
(45) Date of Patent: Nov. 12, 2024

(54) CONNECTOR INCLUDING HEAT SINK AS PART OF HOUSING

(71) Applicant: Yazaki Corporation, Tokyo (JP)

(72) Inventor: Kazutaka Uki, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 368 days.

(21) Appl. No.: 17/843,364

(22) Filed: Jun. 17, 2022

(65) Prior Publication Data

US 2022/0416469 A1 Dec. 29, 2022

(30) Foreign Application Priority Data

Jun. 23, 2021 (JP) ................. 2021-104455

(51) Int. Cl.
| | | |
|---|---|---|
| *H01R 13/512* | (2006.01) | |
| *B60L 53/16* | (2019.01) | |
| *H01R 24/20* | (2011.01) | |
| *H01R 103/00* | (2006.01) | |

(52) U.S. Cl.
CPC ............ *H01R 13/512* (2013.01); *B60L 53/16* (2019.02); *H01R 24/20* (2013.01); *H01R 2103/00* (2013.01); *H01R 2201/26* (2013.01)

(58) Field of Classification Search
CPC .............. H01R 13/512; H01R 2103/00; H01R 2201/26
USPC ........................................ 439/578, 485–487
See application file for complete search history.

(56) References Cited

U.S. PATENT DOCUMENTS

| | | | |
|---|---|---|---|
| 8,123,573 B2 * | 2/2012 | Takehara | H01R 13/53 439/845 |
| 10,033,141 B2 * | 7/2018 | Creusen | G06F 1/20 |
| 2021/0008992 A1 | 1/2021 | Liu et al. | |

FOREIGN PATENT DOCUMENTS

| | | |
|---|---|---|
| JP | 2017-208247 A | 11/2017 |
| JP | 2018-156843 A | 10/2018 |
| WO | 2020/082770 A1 | 4/2020 |

* cited by examiner

*Primary Examiner* — Phuong K Dinh
(74) *Attorney, Agent, or Firm* — Sughrue Mion, PLLC (57) ABSTRACT

A connector includes a terminal and a housing. The terminal is configured to be connected to an electric wire. The housing is configured to contain the terminal. The housing includes a heat sink configured to absorb heat generated in the terminal. The heat sink is a part of a skeleton component forming the housing.

6 Claims, 7 Drawing Sheets

CONNECTOR INCLUDING HEAT SINK AS PART OF HOUSING

CROSS-REFERENCE TO RELATED APPLICATIONS

This application is based on and claims priority under 35 USC 119 from Japanese Patent Application No. 2021-104455 filed on Jun. 23, 2021, the contents of which are incorporated herein by reference.

TECHNICAL FIELD

The present disclosure relates to a connector including a terminal to be connected to an electric wire and a housing in which the terminal is stored.

BACKGROUND ART

In the related art, a connector provided in a vehicle has been proposed in order to supply (charge) electric power from an outside of the vehicle to a battery mounted in the vehicle such as an electric vehicle or a plug-in hybrid vehicle (see, for example, JP-A-2017-208247). This type of connector is also generally referred to as a charging inlet.

The above-described connector (charging inlet) is generally required to have a structure and characteristics defined by various standards. For example, when the above-described connector is actually used, a temperature (so-called operating temperature) of a terminal rises due to Joule heat generated in the terminal at the time of energization. Here, from a viewpoint of quality maintenance, safety, and the like of the connector, an upper limit value of the operating temperature of the terminal and the like are defined by a predetermined standard. In particular, when the battery is rapidly charged or the like, since a large current flows through the connector in a short time, a degree of temperature rise of the terminal per unit time is higher than that in a case of normal charging. Therefore, there is a possibility that it is difficult to keep the operating temperature of the terminal during the rapid charging within a range defined by the above standard only by natural heat dissipation. On the other hand, easily assembling a heat dissipation member (for example, a metal plate or the like) to an outside of the connector is not desirable because miniaturization of the connector is hindered and an installation space of the connector in a vehicle body is limited.

SUMMARY OF INVENTION

The present disclosure has been made in view of the above circumstances, and the present disclosure is to provide a connector capable of preventing an excessive rise in an operating temperature of a terminal while avoiding an increase in a size of the connector.

In order to achieve the above-described object, a connector according to the present disclosure is characterized as follows.

According to an aspect of the present disclosure, there is provided a connector including: a terminal configured to be connected to an electric wire; and a housing configured to contain the terminal, in which the housing includes a heat sink configured to absorb heat generated in the terminal; and the heat sink is a part of a skeleton component forming the housing.

Thus, according to the present disclosure, it is possible to provide a connector capable of preventing an excessive rise in the operating temperature of the terminal while avoiding the increase in the size of the connector.

The present disclosure has been briefly described as above. Details of the present disclosure will be further clarified by reading a configuration for carrying out the disclosure described below with reference to the accompanying drawings.

DESCRIPTION OF EMBODIMENTS

Embodiment

Hereinafter, a connector 1 according to an embodiment of the present disclosure will be described with reference to the drawings. The connector 1 is installed in a vehicle such as a plug-in hybrid vehicle or an electric vehicle and is connected to an electric wire extending from a battery mounted on the vehicle. The connector 1 is also referred to as a charging inlet. By fitting a counterpart connector (so-called charging gun) into a fitting concave portion 63 (see FIG. 1 and the like) of the connector 1, electric power is supplied to the battery from an outside of the vehicle to charge the battery.

Figure 1:
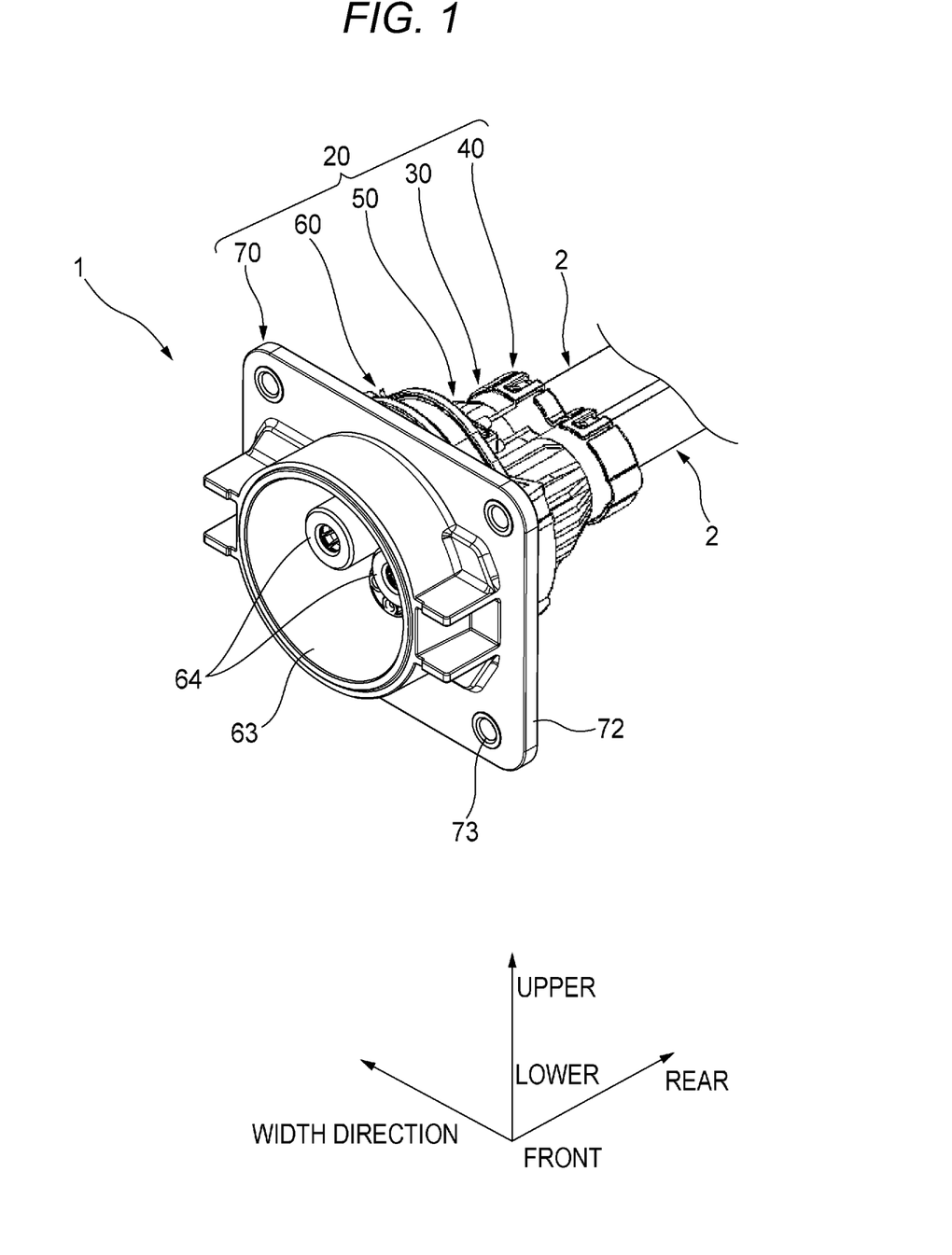
FIG. 1 is a perspective view showing a state in which a connector according to an embodiment of the present disclosure is connected to an electric wire.
Figure 2:
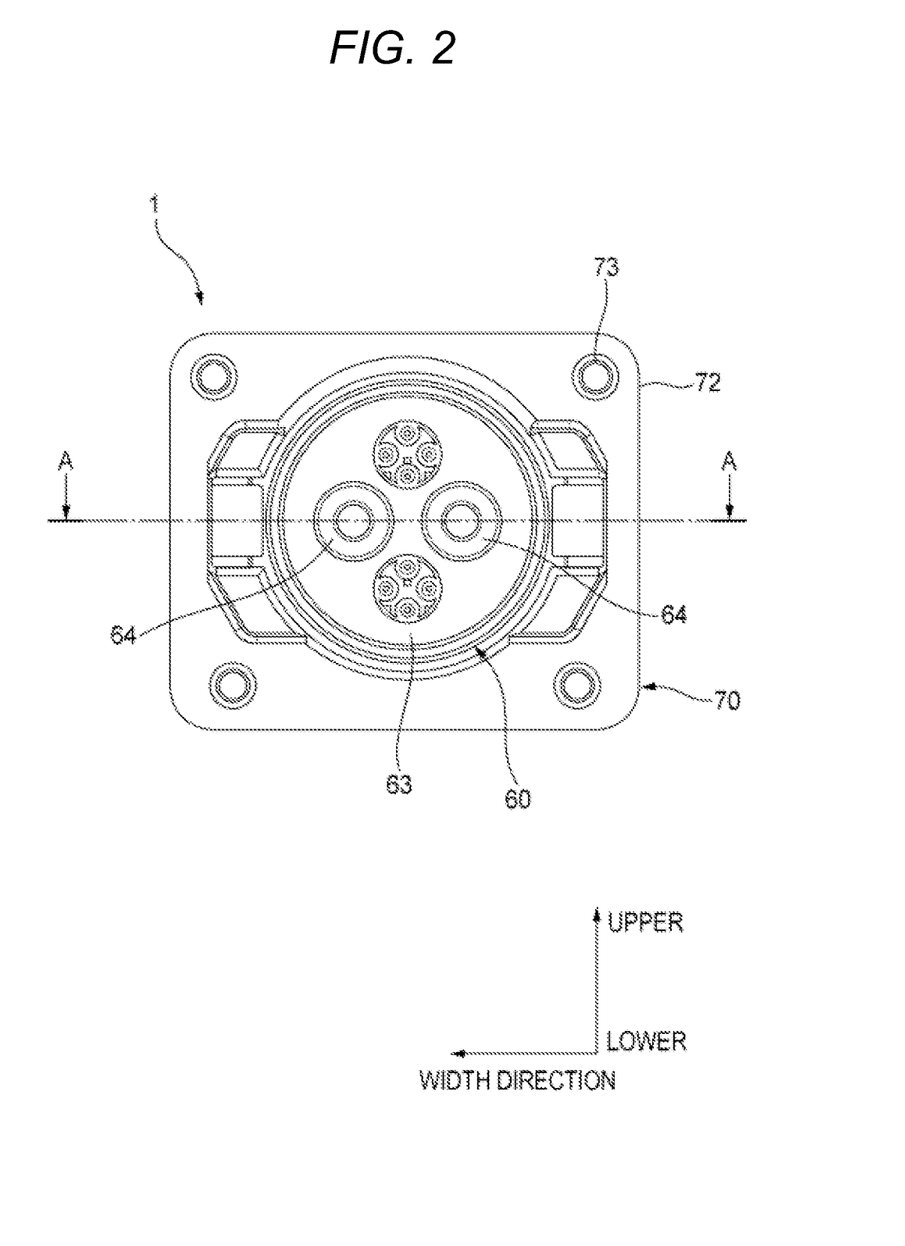
FIG. 2 is a front view of the connector shown in FIG. 1.

Hereinafter, for convenience of description, a "front-rear direction", a "width direction", an "upper-lower direction", "upper", "lower", "front", and "rear" are defined as shown in FIG. 1. The "front-rear direction", the "width direction", and the "upper-lower direction" are orthogonal to each other. The front-rear direction coincides with a fitting direction of the connector 1 and the counterpart connector (not shown), and a front side in the fitting direction as viewed from the connector 1 (a side approaching the counterpart connector) is referred to as a "front side", and a fitting direction release side as viewed from the connector 1 (a side away from the counterpart connector) is referred to as a "rear side".

Figure 5:
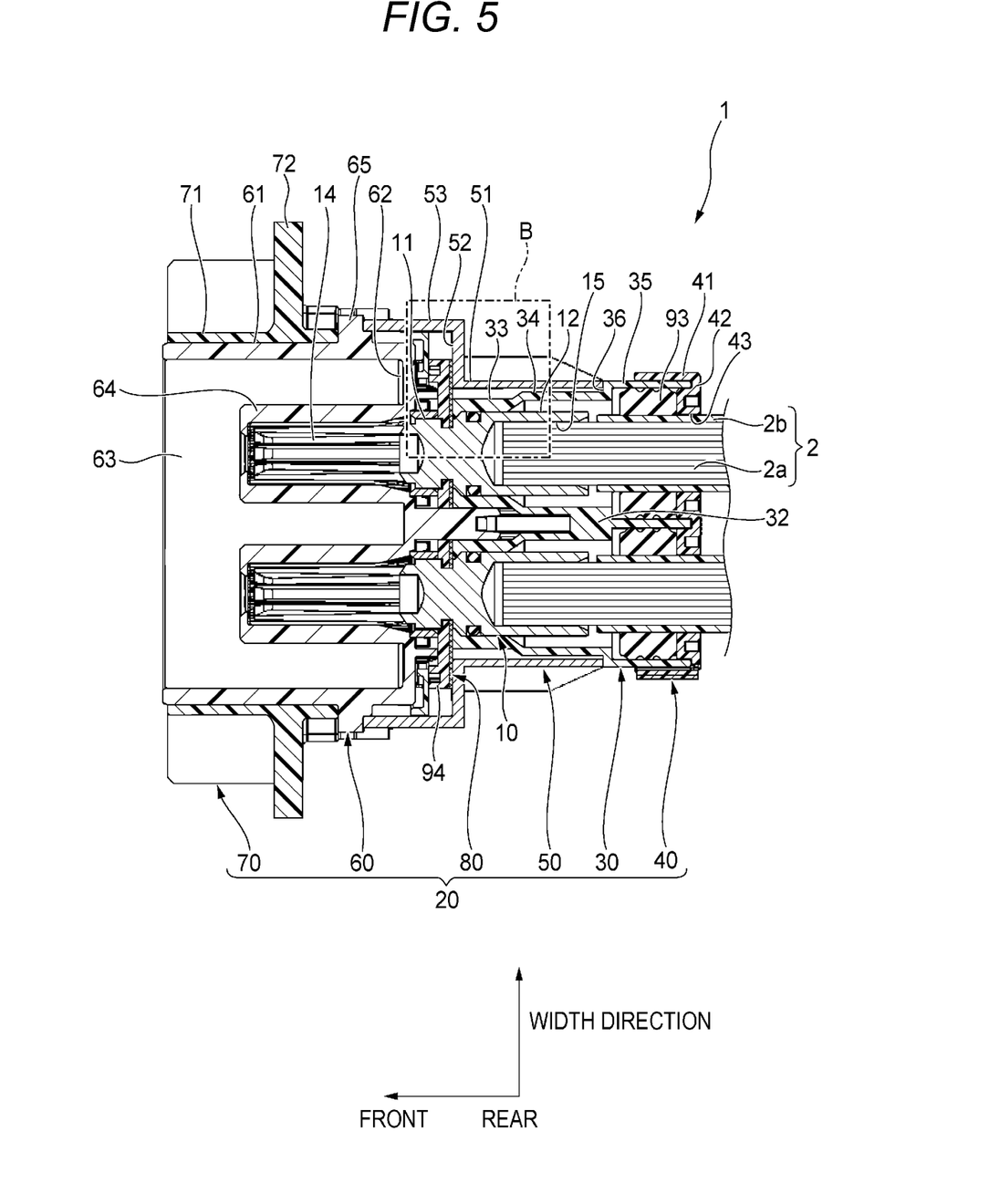
FIG. 5 is a cross-sectional view taken along a line A-A in FIG. 2.

As shown in FIGS. 1 and 5, and the like, the connector 1 includes a pair of terminals 10 and a housing 20 in which the pair of terminals 10 are contained. One end portions of the pair of electric wires 2 are connected to the pair of terminals 10, respectively. The other end portions of the pair of electric wires 2 are connected to the battery (not shown). The electric wire 2 includes a conductor core wire 2a and a coating 2b made of insulating resin material and covering the conductor core wire 2a (see FIG. 5). Hereinafter, each component forming the connector 1 will be described in order.

First, the pair of terminals 10 will be described. In this example, the pair of terminals 10 have the same shape. The terminal 10 is made of metal material and, as shown in FIG. 5, has a stepped columnar portion including a small diameter portion 11 and a large diameter portion 12 positioned on a rear side of the small diameter portion 11. An annular step portion 13 is formed at a boundary portion between the small diameter portion 11 and the large diameter portion 12 (see FIG. 6). The step portion 13 is locked to a locking protrusion portion 37 (see FIG. 6) of a base holder 30, which will be described later.

The small diameter portion 11 is integrally provided with a cylindrical female terminal portion 14 protruding forward from a front end surface thereof. Of the pair of terminals 10, the female terminal portion 14 of one terminal 10 functions as a positive terminal, and the female terminal portion 14 of the other terminal 10 functions as a negative terminal. When the connector 1 and the counterpart connector are fitted to each other, the female terminal portion 14 of the one terminal 10 and the female terminal portion 14 of the other terminal 10 are respectively connected to a positive male terminal portion and a negative male terminal portion of the counterpart connector.

A concave portion 15 recessed forward is formed in a rear end surface of the large diameter portion 12 (see FIG. 5). The conductor core wire 2a exposed at one end portion of the electric wire 2 is inserted into the concave portion 15 and crimped and fixed.

Accordingly, the terminal 10 and one end portion of the electric wire 2 are electrically connected to each other.

Figure 6:
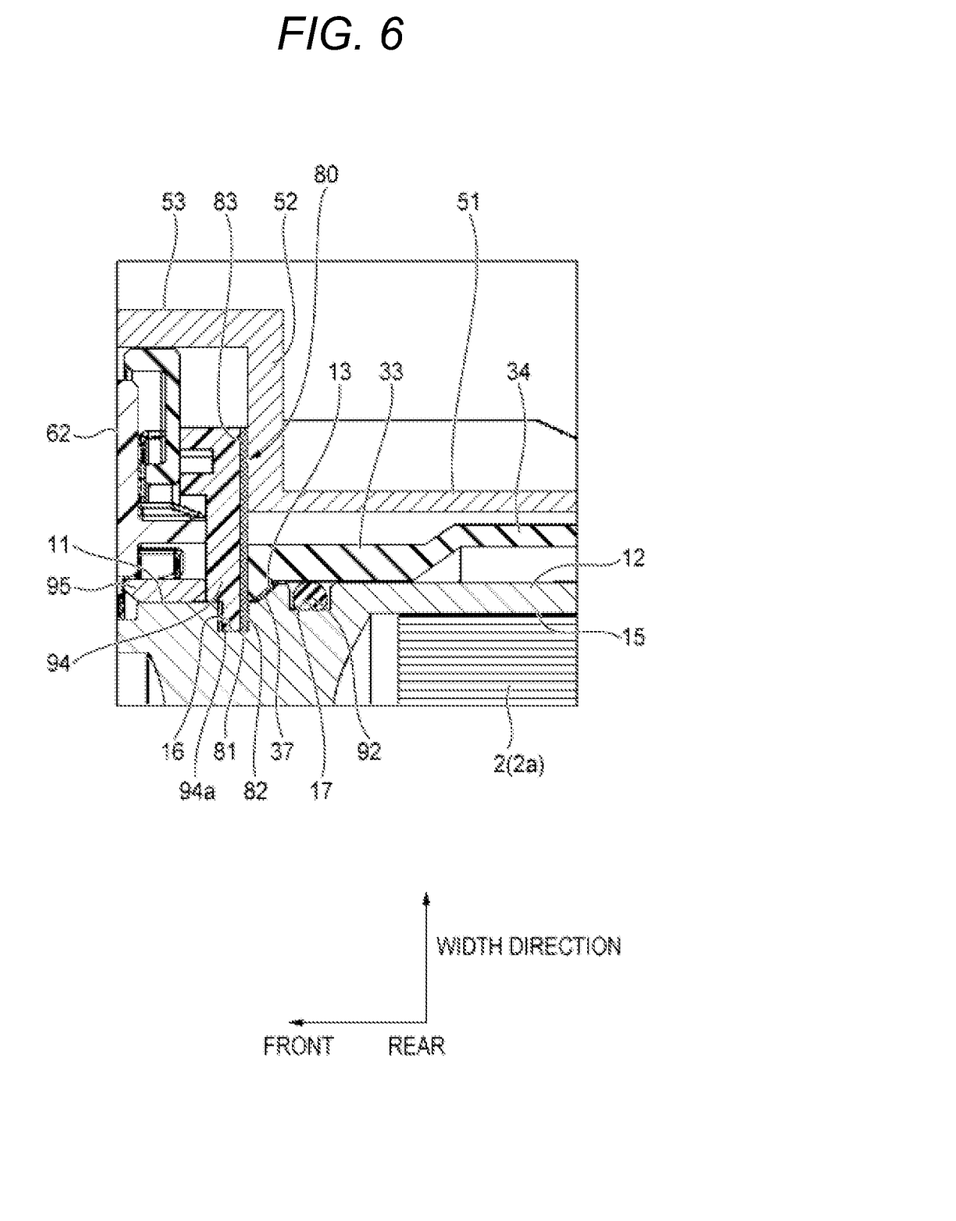
FIG. 6 is an enlarged view of a portion B in FIG. 5.

As shown in FIG. 6, an annular groove 16 is formed on an outer peripheral surface of the small diameter portion 11 in the vicinity of the step portion 13, and an annular groove 17 is formed on an outer peripheral surface of the large diameter portion 12 in the vicinity of the step portion 13. A heat transfer sheet 80 and a lock piece 94 (see FIGS. 4 to 6), which will be described later, are mounted in the annular groove 16, and an O-ring 92 (see FIGS. 5 and 6), which will be described later, is mounted in the annular groove 17. The pair of terminals 10 are described above.

Next, the housing 20 will be described. In this example, as shown in FIGS. 1 and 5, and the like, the housing 20 includes the base holder 30, a rear holder 40, a heat sink 50, an inner housing body 60, and an outer housing body 70. Each of the base holder 30, the rear holder 40, the heat sink 50, the inner housing body 60, and the outer housing body 70 is a skeleton component of the housing 20, and forms a part of an outer surface of the housing 20. Hereinafter, components forming the housing 20 will be described in order.

Figure 4:
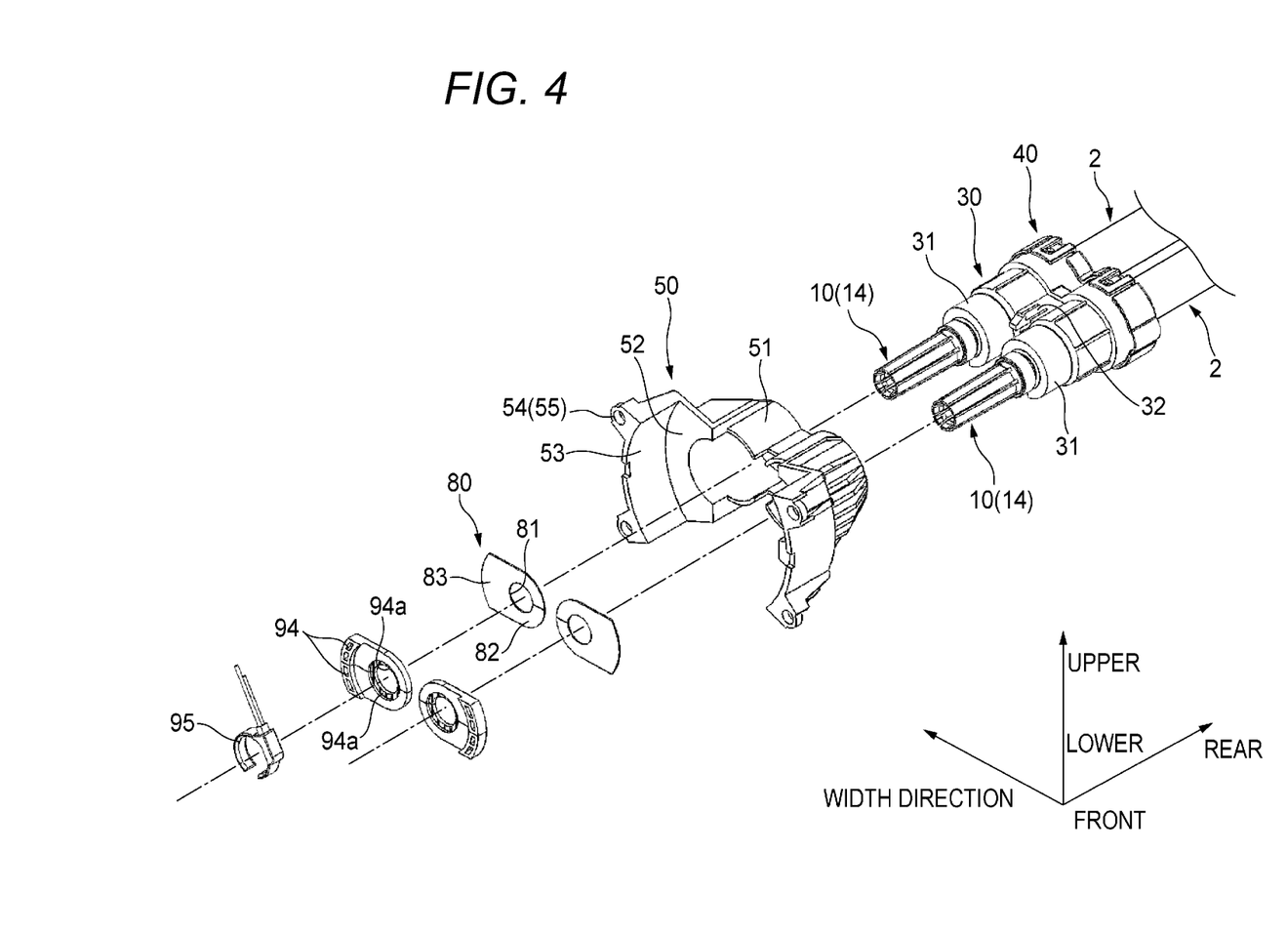
FIG. 4 is a perspective view showing a state in which another part of a plurality of components forming the connector shown in FIG. 1 is disassembled.

First, the base holder 30 will be described. The base holder 30 has a function of holding the pair of terminals 10 in a state where the terminals 10 are spaced apart from each other in the width direction and insulated from each other. The base holder 30 is a resin molded product, and integrally includes a pair of terminal holding portions 31 disposed in the width direction and a coupling portion 32 coupling the pair of terminal holding portions 31 in the width direction, as shown in FIG. 4.

As shown in FIG. 5, the terminal holding portion 31 has a stepped cylindrical shape extending in the front-rear direction and includes a small diameter portion 33, a medium diameter portion 34 positioned on a rear side of the small diameter portion 33, and a large diameter portion 35 positioned on a rear side of the medium diameter portion 34. The coupling portion 32 couples medium diameter portions 34 and large diameter portions 35 of the pair of terminal holding portions 31. The pair of terminals 10 are inserted into the pair of terminal holding portions 31 from the rear side.

An annular step portion 36 is formed at a boundary portion between the medium diameter portion 34 and the large diameter portion 35. A rear end surface of a tubular portion 51 of the heat sink 50, which will be described later, is locked to the step portion 36 (see FIG. 5). The annular locking protrusion portion 37 is formed on an inner wall surface of a front end portion of the small diameter portion 33 so as to protrude inward in a radial direction of the small diameter portion 33 in correspondence with the step portion 13 of the terminal 10.

Next, the rear holder 40 will be described. The rear holder 40 is assembled to the base holder 30 from the rear side, and has a function of holding the pair of electric wires 2 extending rearward from the pair of terminals 10 in a state of being spaced apart from each other in the width direction. The rear holder 40 is a resin molded product and integrally includes a tubular portion 41 extending in the front-rear direction and a rear wall portion 42 closing a rear opening of the tubular portion 41.

The tubular portion 41 has an outer peripheral shape corresponding to an outer peripheral shape formed by the pair of large diameter portions 35 and the coupling portion 32 of the base holder 30. The tubular portion 41 can be mounted on a rear end portion of the base holder 30 so as to cover outer peripheral surfaces of rear end portions of the pair of large diameter portions 35 and the coupling portion 32. The rear wall portion 42 is formed with a pair of electric wire through holes 43 that are disposed in the width direction and penetrate in the front-rear direction, corresponding to the pair of large diameter portions 35. The pair of electric wires 2 are inserted into the pair of electric wire through holes 43 (see FIG. 5).

Next, the heat sink 50 will be described. Among the plurality of components forming the skeleton component of the housing 20, only the heat sink 50 is made of metal material. The heat sink 50 is assembled to the base holder 30 from the front side, and has a function of absorbing and dissipating heat generated in the pair of terminals 10. This point will be described in detail later.

As shown in FIGS. 4 and 5, the heat sink 50 includes the tubular portion 51 extending in the front-rear direction. The tubular portion 51 has an outer peripheral shape corresponding to an outer peripheral shape formed by the pair of medium diameter portions 34 and the coupling portion 32 of the base holder 30, and can be mounted on the base holder 30 so as to cover outer peripheral surfaces of the pair of medium diameter portions 34 and the coupling portion 32.

At a front end portion of the tubular portion 51, a pair of extending portions 52 extending outward in the width direction from both side portions in the width direction of the front end portion of the tubular portion 51 and a pair of side wall portions 53 extending forward from extending end portions of the pair of extending portions 52 are integrally provided. The pair of side wall portions 53 have a shape corresponding to a part of an outer peripheral shape (cylindrical shape) of a tubular portion 61 (see also FIG. 3), which will be described later, of the inner housing body 60 in a circumferential direction when viewed in the front-rear direction, and can be mounted on the tubular portion 61 so as to cover an outer peripheral surface of a rear end portion of the tubular portion 61.

As shown in FIG. 4, bolt insertion portions 54 are provided at a plurality of positions (four positions in this example) on outer peripheral surfaces (outer side faces in the width direction) of the pair of side wall portions 53. A bolt through hole 55 is formed in each bolt insertion portion 54 so as to penetrate the bolt insertion portion 54 in the front-rear direction. Bolts 91 (see FIG. 3) for assembling the housing 20 are inserted into the bolt through holes 55.

Next, the inner housing body 60 will be described. The inner housing body 60 is assembled to the tubular portion 51 of the heat sink 50 from the front side, and has a function of forming the fitting concave portion 63 (see also FIG. 1) of the connector 1. The inner housing body 60 is a resin molded product and integrally includes the tubular portion 61 extending in the front-rear direction and a rear wall portion 62 closing a rear opening of the tubular portion 61. The tubular portion 61 and the rear wall portion 62 define the fitting concave portion 63 that opens forward and is recessed rearward.

Figure 3:
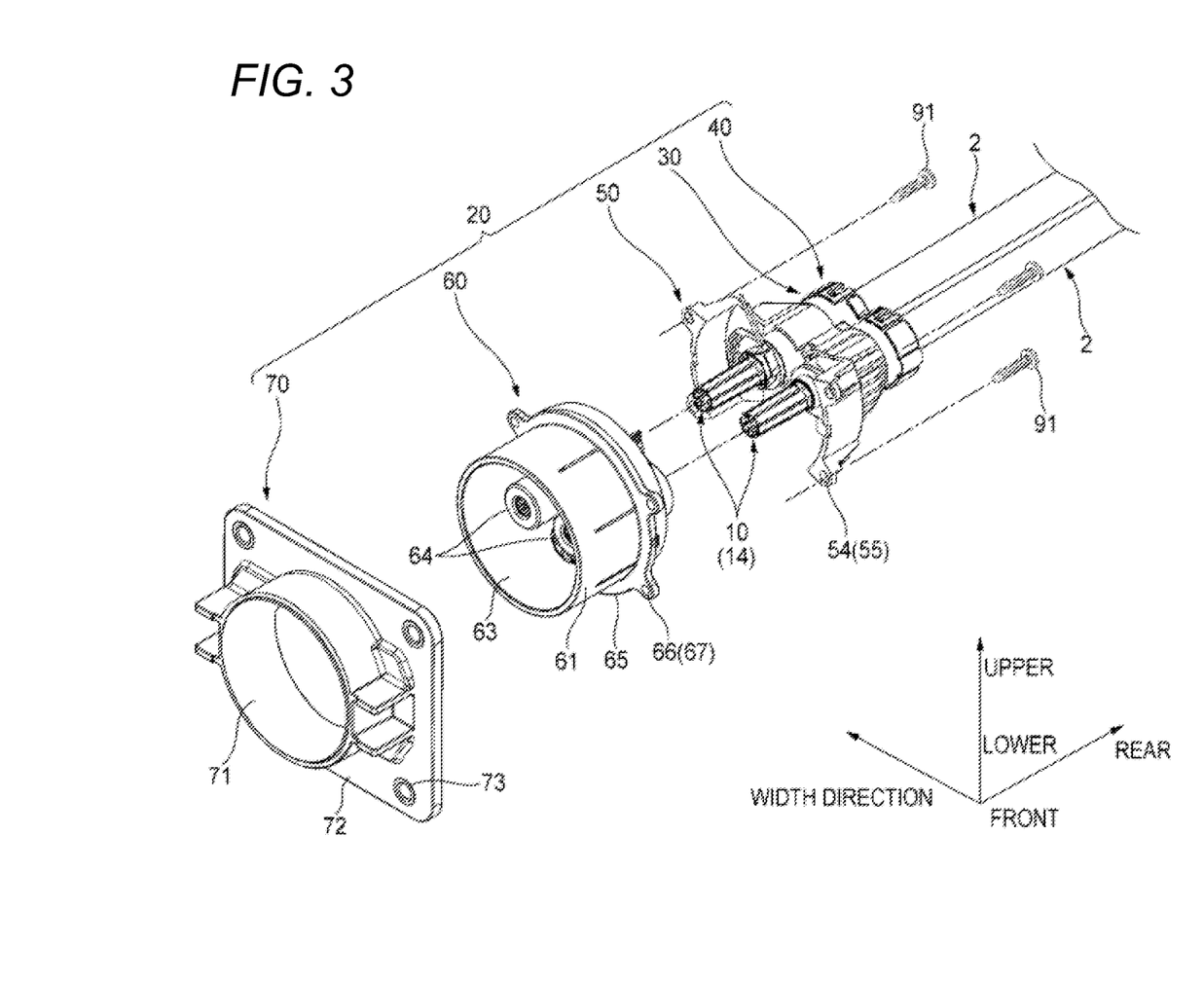
FIG. 3 is a perspective view showing a state in which a part of a plurality of components forming the connector shown in FIG. 1 is disassembled.

The rear wall portion 62 is provided with a pair of cylindrical female terminal accommodating portions 64 corresponding to female terminal portions 14 of the pair of terminals 10 so as to protrude forward (see FIGS. 3 and 5). Each female terminal accommodating portion 64 is positioned in the fitting concave portion 63 and has an internal space penetrating in the front-rear direction.

As shown in FIG. 3, an annular flange portion 65 protruding outward in the radial direction of the tubular portion 61 is provided at a position on a rear side of a center in the front-rear direction on an outer peripheral surface of the tubular portion 61. The flange portion 65 is provided with bolt insertion portions 66 at a plurality of positions (four positions in this example) in the circumferential direction corresponding to the plurality of bolt insertion portions 54 of the heat sink 50. A bolt through hole 67 is formed in each bolt insertion portion 66 so as to penetrate the bolt insertion portion 66 in the front-rear direction. The bolts 91 (see FIG. 3) for assembling the housing 20 are inserted into the bolt through holes 67.

Next, the outer housing body 70 will be described. The outer housing body 70 is assembled to the tubular portion 61 of the inner housing body 60 from the front side, and has a function of fixing the entire housing 20 to an attachment target portion (not shown) of the connector 1 provided in the vehicle. The outer housing body 70 is a resin molded product and includes a tubular portion 71 extending in the front-rear direction. The tubular portion 71 can be mounted on the tubular portion 61 from the front side so as to cover the outer peripheral surface of the tubular portion 61 of the inner housing body 60 (see FIG. 5).

As shown in FIG. 3, an annular flange portion 72 protruding outward in the radial direction of the tubular portion 71 is provided at a position on a rear side of a center in the front-rear direction on an outer peripheral surface of the tubular portion 71. The flange portion 72 has a rectangular outer peripheral shape when viewed in the front-rear direction. Bolt through holes 73 penetrating in the front-rear direction are formed in four corners of the flange portion 72. A bolt (not shown) for fixing the connector 1 to the attachment target portion above of the connector 1 is inserted into the bolt through hole 73.

The components forming the skeleton component of the housing 20 are described above.

Next, an assembly procedure of the connector 1 will be described. First, the pair of terminals 10 to which the one end portions of the pair of electric wires 2 are connected are inserted into the base holder 30. Therefore, as preparation for this, as shown in FIG. 5, the pair of electric wire through holes 43 of the rear holder 40 are inserted into coatings 2b of the pair of electric wires 2 connected to the pair of terminals 10 from the front side. Next, annular rubber packings 93 are inserted into the coatings 2b of the pair of electric wires from the front side so as to be adjacent to a front side of the rear wall portion 42 of the rear holder 40. Further, the O-ring 92 (see FIG. 6) made of rubber material is mounted in each of the annular grooves 17 of the pair of terminals 10.

Next, the pair of terminals 10 are inserted into the pair of terminal holding portions 31 of the base holder 30 from the rear side. This insertion is continued until small diameter portions 11 and the female terminal portions 14 of the pair of terminals 10 protrude forward from front ends of the pair of terminal holding portions 31 and the step portions 13 of the pair of terminals 10 are locked to the locking protrusion portions 37 of the pair of terminal holding portions 31. In a state in which the insertion is completed (that is, a state in which the insertion of the pair of terminals 10 into the base holder 30 is completed), as shown in FIGS. 5 and 6, the O-ring 92 mounted on the terminal 10 is in pressure contact with an inner wall surface of the small diameter portion 33 of the terminal holding portion 31.

When the insertion of the pair of terminals 10 into the base holder 30 is completed, the rear holder 40 is then mounted to the base holder 30. Therefore, by pressing the rear holder 40 forward and moving the rear holder 40 and the pair of packings 93 positioned on a front side of the rear holder 40 forward with respect to the pair of electric wires 2, the tubular portion 41 of the rear holder 40 is mounted on the rear end portion of the base holder 30 (see FIGS. 4 and 5).

In a state where the mounting of the rear holder 40 on the base holder 30 is completed, as shown in FIG. 5, each packing 93 is pressed and sandwiched between the inner wall surface of the large diameter portion 35 of the terminal holding portion 31 and the outer peripheral surface of the electric wire 2 (the coating 2b). As a result, water stop function of the pair of O-rings 92 and the pair of packings 93 is exhibited, and thus water is prevented from entering internal space of the pair of terminal holding portions 31 (that is, a connection portion between the terminal 10 and the conductor core wire 2a of the electric wire 2) from an outside. Further, the pair of terminals 10 are held in a state of being spaced apart from each other in the width direction and being insulated from each other by the base holder 30, and the pair of electric wires 2 extending rearward from the pair of terminals 10 are held in a state of being spaced from each other in the width direction by the rear holder 40.

When the mounting of the rear holder 40 on the base holder 30 is completed, the heat sink 50 is then mounted on the base holder 30 (see FIG. 4). Therefore, the tubular portion 51 of the heat sink 50 is mounted on the base holder 30 from the front side so as to cover the outer peripheral surfaces of the pair of medium diameter portions 34 and the coupling portions 32 of the base holder 30 (see FIG. 5). In a state where the mounting is completed, as shown in FIG. 5, the rear end surface of the tubular portion 51 contacts the step portion 36 of the base holder 30. In this state, positions of front end surfaces of the pair of extending portions 52 of the heat sink 50 in the front-rear direction coincide with positions of front end surfaces of the pair of terminal holding portions 31 in the front-rear direction.

When the mounting of the heat sink 50 on the base holder 30 is completed, as shown in FIGS. 4 to 6, the heat transfer sheet 80 is then mounted on each of the annular grooves 16 of the pair of terminals 10 positioned and exposed on a front side of the front ends of the pair of terminal holding portions 31 (that is, front ends of the small diameter portions 33). Next, the pair of upper and lower lock pieces 94 are mounted so as to be adjacent to a front side of the heat transfer sheet 80.

Figure 7:
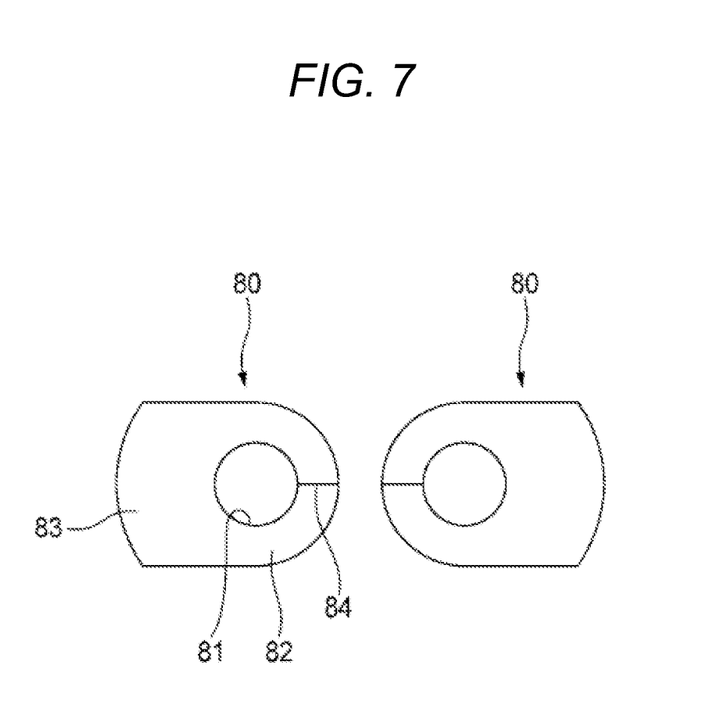
FIG. 7 is a front view of a heat transfer sheet shown in FIG. 5.

The heat transfer sheet 80 is made of material having insulating properties and excellent heat transfer properties, and has a function of transferring heat from the terminal 10 to the heat sink 50 (this will be described later). As shown in FIGS. 4 and 7, the heat transfer sheet 80 includes an annular body portion 82 positioned around a through hole 81, and an extending portion 83 extending away from the through hole 81 from one side of the body portion 82 in the circumferential direction. A slit 84 connecting the through hole 81 and an outer peripheral portion of the body portion 82 is formed at a position on a side opposite to the extending portion 83 in the circumferential direction of the body portion 82.

The heat transfer sheet 80 is mounted in the annular groove 16 by causing a peripheral edge portion of the through hole 81 in the body portion 82 to enter the annular groove 16 in an orientation in which the extending portion 83 is positioned on an outer side in the width direction with respect to the through hole 81. At this time, the body portion 82 is temporarily deformed so that the slit 84 is widened, and the peripheral edge portion of the through hole 81 in the body portion 82 can be made to enter the annular groove 16 through the slit 84. Therefore, an operation of mounting the heat transfer sheet 80 in the annular groove 16 is facilitated.

The pair of upper and lower lock pieces 94 have a function of preventing the heat sink 50 mounted on the base holder 30 from coming off (separating) forward from the base holder 30. The pair of upper and lower lock pieces 94 are plates made of resin material, and can be coupled and separated vertically. As shown in FIG. 4, the pair of upper and lower lock pieces 94 have a shape corresponding to the heat transfer sheet 80 in a state of being coupled vertically. Each of the pair of upper and lower lock pieces 94 is formed with a semicircular arc-shaped concave portion 94a at a position corresponding to the through hole 81 of the heat transfer sheet 80.

The pair of upper and lower lock pieces 94 are mounted in the annular groove 16 by allowing a peripheral edge portion of the concave portion 94a of the upper lock piece 94 to enter an upper side portion of the annular groove 16 and allowing a peripheral edge portion of the concave portion 94a of the lower lock piece 94 to enter a lower side portion of the annular groove 16 and coupling the two vertically in an orientation corresponding to an orientation of the heat transfer sheet 80.

Thus, by mounting the heat transfer sheet 80 and the pair of upper and lower lock pieces 94 in each of the annular grooves 16 of the pair of terminals 10, as shown in FIG. 6, the body portion 82 of the heat transfer sheet 80 is sandwiched in the front-rear direction by a groove side face on a rear side of the annular groove 16 of the terminal 10 and the peripheral edge portions of the concave portions 94a of the pair of upper and lower lock pieces 94, and the extending portion 83 of the heat transfer sheet 80 is sandwiched in the front-rear direction by the front end surface of the extending portion 52 of the heat sink 50 and outer end portions in the width direction of the pair of upper and lower lock pieces 94.

As a result, the body portion 82 of the heat transfer sheet 80 is brought into close contact with (the annular groove 16 of) the terminal 10, and the extending portion 83 of the heat transfer sheet 80 is brought into close contact with (the extending portion 52 of) the heat sink 50, so that the heat transfer sheet 80 is brought into a state in which heat can be transferred from the terminal 10 to the heat sink 50. Further, the peripheral edge portions of the concave portions 94a of the pair of upper and lower lock pieces 94 are mounted in the annular groove 16 of the terminal 10, and the outer end portions in the width direction of the pair of upper and lower lock pieces 94 are locked to the front end surface of the extending portion 52 of the heat sink 50 via the extending portion 83 of the heat transfer sheet 80, so that the heat sink 50 mounted on the base holder 30 is prevented from coming off (separating) forward from the base holder 30.

In addition, a pair of thermistors 95 are mounted on outer peripheral surfaces of the small diameter portions 11 of the pair of terminals 10 (see FIGS. 4 and 6). Accordingly, a temperature of the pair of terminals 10 can be measured, so that transition of the temperature of the pair of terminals 10 when the connector 1 is used (when the battery is charged) can be monitored. Although the thermistor 95 is mounted on only one of the pair of terminals 10 in FIG. 4 for the sake of convenience, the thermistors 95 are actually mounted on both of the pair of terminals 10.

When the heat transfer sheet 80 and the pair of upper and lower lock pieces 94 are mounted in each of the annular grooves 16 of the pair of terminals 10, the inner housing body 60 is then mounted on the heat sink 50 (see FIGS. 3 and 5). Therefore, the inner housing body 60 is mounted on the heat sink 50 from the front side such that the pair of side wall portions 53 of the heat sink 50 cover a part of the outer peripheral surface of the tubular portion 61 of the inner housing body 60 and the female terminal portions 14 of the pair of terminals 10 are inserted into the pair of female terminal accommodating portions 64 of the inner housing body 60 (see FIG. 5). In a state in which the mounting is completed, as shown in FIG. 5, the front end surfaces of the pair of side wall portions 53 of the heat sink 50 contact a rear end surface of the flange portion 65 of the inner housing body 60.

When the mounting of the inner housing body 60 on the heat sink 50 is completed, the outer housing body 70 is then mounted on the inner housing body 60 (see FIGS. 3 and 5). Therefore, the outer housing body 70 is mounted on the inner housing body 60 from the front side so that the tubular portion 71 of the outer housing body 70 covers the outer peripheral surface of the tubular portion 61 of the inner housing body 60 (see FIG. 5). In a state in which the mounting is completed, as shown in FIG. 5, a rear end surface of the tubular portion 71 of the outer housing body 70 contacts a front end surface of the flange portion 65 of the inner housing body 60.

When the mounting of the outer housing body 70 on the inner housing body 60 is completed, as shown in FIG. 3, a plurality of (four in this example) bolts 91 are then inserted from the rear side into the plurality of bolt through holes 55 of the heat sink 50 and the plurality of bolt through holes 67 of the inner housing body 60, and fastened to a plurality of fastening portions (not shown) provided in the outer housing body 70. Accordingly, the heat sink 50 and the inner housing body 60 are fastened together to the outer housing body 70, so that the base holder 30, the rear holder 40, the heat sink 50, the inner housing body 60, and the outer housing body 70, which form the skeleton components of the housing 20, are integrated. Accordingly, the assembly of the connector 1 is completed, and the connector 1 shown in FIG. 1 is obtained.

The assembled connector 1 is fastened and fixed to the attachment target portion (not shown) of the connector 1 provided in the vehicle using a plurality of bolts (not shown) inserted into the plurality of bolt through holes 73 of the outer housing body 70.

When the battery (not shown) mounted on the vehicle is charged, the counterpart connector (so-called charging gun) is fitted into the fitting concave portion 63 of the connector 1 fixed to the attachment target portion of the vehicle. Accordingly, electric power is supplied from the outside of the vehicle to the battery via the counterpart connector, the connector 1, and the pair of electric wires 2 in this order, and the battery is charged.

Next, an operation of providing the metal heat sink 50 and the heat transfer sheet 80 on the connector 1 will be described. As described above, when the battery is charged using the connector 1, the temperature of the pair of terminals 10 in the connector 1 rises due to Joule heat caused by energization. In particular, when the battery is rapidly charged, a large current passes through the pair of terminals 10 in a short time, and thus a degree of temperature rise of the pair of terminals 10 per unit time is likely to increase.

In this regard, in the present embodiment, the heat generated in the terminal 10 is mainly transferred to the heat sink 50 via the heat transfer sheet 80 and is absorbed by the heat sink 50. The heat absorbed by the heat sink 50 is dissipated to the outside through an outer surface (a surface exposed to the outside) of the heat sink 50. As a result, a temperature rise of the terminal 10 is prevented.

Further, the heat sink 50 is made of metal material instead of resin material. In general, when a metal member and a resin member are compared with each other in the same volume, a heat capacity of the metal member is larger than a heat capacity of the resin member due to the fact that a density of a metal is higher than a density of a resin. Therefore, a heat capacity of the metal heat sink 50 is larger than a heat capacity of a resin heat sink having the same shape as the heat sink 50. That is, when the heat sink 50 is made of metal material instead of resin material, the heat capacity of the heat sink 50 can be further increased. A material of the heat sink 50 is not necessarily limited to metal, and may be any other material as long as the heat sink 50 has an appropriate heat capacity as described above.

As the heat capacity of the heat sink 50 increases, a temperature rise of the heat sink 50 that absorbs the heat generated in the terminal 10 becomes moderate. Therefore, for example, even when the Joule heat generated in the terminal 10 is large as in the case of rapid charging, the temperature rise of the heat sink 50 can be made moderate by using the metal heat sink 50 having a large heat capacity, and as a result, the temperature rise of the terminal 10 can also be made moderate.

A temperature of the heat sink 50, which rises due to the rapid charging, falls due to natural heat dissipation after the rapid charging is completed. At that time, as the heat capacity of the heat sink 50 increases, a temperature decrease of the heat sink 50 becomes moderate (that is, a relatively long time is required until the temperature of the heat sink 50 returns to a normal temperature). However, the connector 1 is not used for purposes other than charging of the battery, and it is difficult to assume a situation in which the rapid charging is started again after a short period of time after completion of the rapid charging. Therefore, even if the temperature decrease of the heat sink 50 after the rapid charging becomes moderate (even if a relatively long time is required until the temperature of the heat sink 50 returns to the normal temperature), there is no problem in light of the function of the connector 1.

Further, the heat sink 50 forms a part of the skeleton component of the housing 20. Therefore, an increase in a size of the connector 1 can be prevented as compared with an aspect in which a heat sink for absorbing and dissipating the heat generated in the terminal 10 is assembled to the outside of the housing 20 (connector 1).

<Operation and Effect>

As described above, according to the connector 1 of the present embodiment, a part of the skeleton component of the housing 20 in which the terminal 10 is stored includes the heat sink 50. Since the heat generated in the terminal 10 is absorbed by the heat sink 50 having a large heat capacity, the temperature rise of the terminal 10 can be moderated even when the Joule heat generated in the terminal 10 per unit time is large, for example, at the time of the rapid charging. Further, since the heat sink 50 itself functions as the skeleton component of the housing 20, it is possible to prevent an increase in the size of the connector 1. Therefore, the connector 1 according to the present embodiment can prevent an excessive rise in the operating temperature of the terminal 10 during use while avoiding an increase in the size of the connector 1.

Further, according to the connector 1 of the present embodiment, the heat transfer sheet 80 provided in the housing 20 directly contacts the terminal 10 and the heat sink 50. Accordingly, the heat generated in the terminal 10 is efficiently transferred to the heat sink 50 via the heat transfer sheet 80, and thus a rise in the operating temperature of the terminal 10 can be more appropriately prevented.

Further, according to the connector 1 of the present embodiment, the heat transfer sheet 80 has a sheet shape, and includes the through hole 81 through which the terminal 10 is inserted and the slit 84 connecting the through hole 81 and the outer peripheral portion of the heat transfer sheet 80. Accordingly, the terminal 10 can be inserted into the through hole 81 through the slit 84, and thus the operation of mounting the heat transfer sheet 80 on the terminal 10 is facilitated. Further, by appropriately designing a diameter of the through hole 81 in accordance with a thickness of the terminal 10, the heat transfer sheet 80 can be easily brought into close contact with the terminal 10. Therefore, it is possible to more efficiently absorb the heat from the terminal 10 via the heat transfer sheet 80.

Further, according to the connector 1 of the present embodiment, the heat sink 50 forms a part of the outer surface of the housing 20. Accordingly, the heat absorbed by the heat sink 50 from the terminal 10 is dissipated to the outside of the connector 1 through the outer surface of the heat sink 50. Therefore, it is possible to more reliably prevent the temperature rise of the terminal 10 during use.

<Other Aspects>

The present disclosure is not limited to the above embodiment and various modifications can be adopted within the scope of the present disclosure. For example, the present disclosure is not limited to the above embodiments, and can be modified, improved, and the like as appropriate. In addition, a material, shape, size, number, arrangement position, and the like of each component in the above-described embodiment are optional and are not limited as long as the present disclosure can be achieved.

For example, in the above embodiment, a heat transfer member (heat transfer sheet 80) that transfers the heat from the terminal 10 to the heat sink 50 is provided. In contrast, such a heat transfer member may not be provided. In this case, the heat generated in the terminal 10 is transferred to the heat sink 50 via the base holder 30 and the like forming the housing 20.

Further, in the above embodiment, a pair of heat transfer sheets 80 provided corresponding to the pair of terminals 10 are separated from each other. In contrast, a single heat transfer sheet in which the pair of heat transfer sheets 80 are connected may be used as long as the single heat transfer sheet has insulating properties.

Further, in the above embodiment, the slit 84 is provided in the heat transfer sheet 80. In contrast, such a slit may not be provided in the heat transfer sheet 80. In this case, the heat transfer sheet 80 can be mounted in the annular groove 16 by inserting the through hole 81 of the heat transfer sheet 80 into the terminal 10 (the small diameter portion 11) and causing the peripheral edge portion of the through hole 81 of the heat transfer sheet 80 to enter the annular groove 16.

Here, features of the embodiment of the connector 1 according to the present disclosure described above will be briefly summarized and listed in the following [1] to [7].

[1] A connector (1) including:
- a terminal (10) configured to be connected to an electric wire (2); and
- a housing (20) configured to contain the terminal (10), in which
- the housing (20) includes a heat sink (50) that is configured to absorb heat generated in the terminal (10); and
- the heat sink (50) is a part of a skeleton component forming the housing (20).

[2] The connector (1) according to [1], in which
- the housing (20) includes an insulating heat transfer member (80) having a hole (81) into which the terminal (10) is inserted; and
- the heat transfer member (80) is disposed such that at least a part of a peripheral edge of the hole (81) of the heat transfer member (80) is in contact with the terminal (10) in a case that the terminal (10) is inserted into the hole (81), and another part (83) of the heat transfer member (80) is in contact with the heat sink (50).

[3] The connector (1) according to [2], in which
- the heat transfer member (80) has a sheet shape and has a slit (84) extending from the hole to an outer peripheral portion of the heat transfer member (80).

[4] The connector (1) according to any one of [1] to [3], in which
- the heat sink (50) forms at least a part of an outer surface of the housing (20).

[5] The connector (1) according to any one of [1] to [4], in which
- the heat sink (50) is made of metal material.

[6] The connector according to any one of [1] to [5], in which
- the heat sink (50) has a tubular portion (51).

[7] The connector according to any one of [1] to [6], in which
- an another part of the skeleton component is made of resin material.

According to the connector having a configuration of the above [1], the structural member including the heat sink forms a part of the skeleton component of the housing in which the terminal is stored. Accordingly, by absorbing the heat generated in the terminal at the time of energization with the heat sink having a large heat capacity, even when an amount of heat generated in the terminal per unit time is large as in the case of rapid charging, it is possible to prevent rapid rise in an operating temperature of the terminal and to moderately increase the operating temperature of the terminal. Further, since the structural member itself including the heat sink is a part of the skeleton component of the housing, it is possible to prevent an increase in a size of the connector as compared with a case where a separate heat sink or the like is assembled to an outside of the connector. Therefore, the connector according to this configuration can prevent an excessive rise in the operating temperature of the terminal while avoiding the increase in the size of the connector.

The "skeleton component" of the housing refers to, for example, a component having sufficient hardness and strength so as to maintain a shape of the housing itself so as to hold a position of the terminal against an external force applied to the terminal when the terminal and a counterpart terminal are fitted to each other. In other words, the skeleton component represents a component made of material that does not cause softening, embrittlement, or the like to the extent that it is difficult to hold the shape due to a rise in the operating temperature of the terminal.

According to the connector having a configuration of the above [2], the heat transfer member provided in the housing surrounds the terminal and directly contacts the terminal, and contacts the structural member including the heat sink. Accordingly, the heat generated in the terminal is efficiently transferred to the structural member including the heat sink via the heat transfer member, and thus an excessive rise in the operating temperature of the terminal can be more appropriately prevented.

According to the connector having a configuration of the above [3], the heat transfer member has a sheet shape, and includes the slit connecting the hole through which the terminal is inserted and the outer peripheral portion of the heat transfer member. Accordingly, the terminal can be disposed in the hole through the slit, and thus an operation of mounting the heat transfer member on the terminal is facilitated. Further, by appropriately designing a diameter of the hole in accordance with a thickness of the terminal, the heat transfer member can be easily brought into close contact with the terminal so as to surround the terminal. Therefore, the heat generated in the terminal can be more efficiently transferred to the structural member including the heat sink via the heat transfer member.

According to the connector having a configuration of the above [4], the structural member including the heat sink forms at least a part of the outer surface of the housing. Accordingly, the heat absorbed by the structural member including the heat sink from the terminal is easily dissipated from the structural member to the outside of the connector. Therefore, the excessive rise in the operating temperature of the terminal can be more appropriately prevented.

What is claimed is:

1. A connector comprising:
a terminal configured to be connected to an electric wire; and
a housing configured to contain the terminal, wherein
the housing comprises a heat sink configured to absorb heat generated in the terminal; and
the heat sink is a part of a skeleton component forming the housing,
the housing comprises an insulating heat transfer member having a hole into which the terminal is inserted, and
the heat transfer member is disposed such that at least a part of a peripheral edge of the hole of the heat transfer member is in contact with the terminal in a case that the terminal is inserted into the hole, and another part of the heat transfer member is in contact with the heat sink.

2. The connector according to claim 1, wherein
the heat transfer member has a sheet shape and has a slit extending from the hole to an outer peripheral portion of the heat transfer member.

3. The connector according to claim 1, wherein
the heat sink forms at least a part of an outer surface of the housing.

4. The connector according to claim 1, wherein the heat sink is comprised of metal material.
5. The connector according to claim 1, wherein the heat sink has a tubular portion.
6. The connector according to claim 1, wherein an another part of the skeleton component is comprised of resin material.

\* \* \* \* \*